Sept. 25, 1923.
J. W. DICKENS
ARTIFICIAL FISH BAIT
Filed March 11, 1920
1,468,627
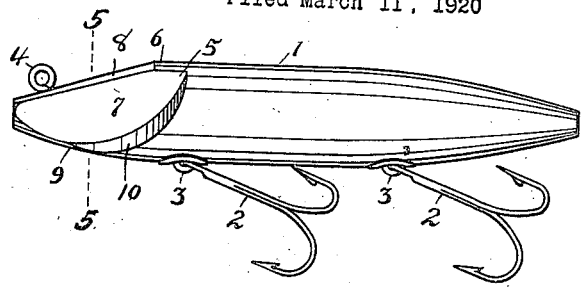
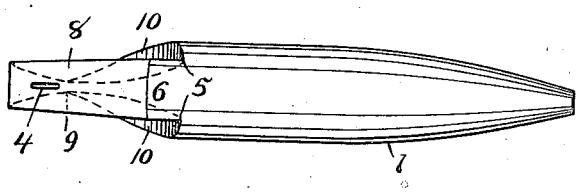
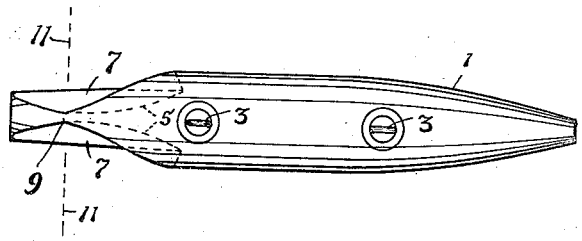
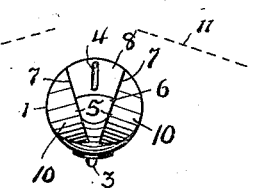
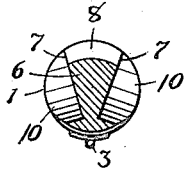
John W. Dickens INVENTOR
BY
H. G. Burns ATTORNEY.

Patented Sept. 25, 1923.

1,468,627

UNITED STATES PATENT OFFICE.

JOHN W. DICKENS, OF FORT WAYNE, INDIANA.

ARTIFICIAL FISH BAIT.

Application filed March 11, 1920. Serial No 364,903.

*To all whom it may concern:*

Be it known that I, JOHN W. DICKENS, a citizen of the United States of America, and resident of Fort Wayne, in the county of Allen and State of Indiana, have invented certain new and useful Improvements in Artificial Fish Baits, of which the following is a specification.

This invention relates to improvements in artificial fish baits particularly to the form of the bait body, and especially in the formation of the head thereof, the object being to construct the bait and to so form the head that the bait will be buoyant in water and tend to dive beneath the surface of the water to a considerable depth when drawn headlong therethrough by the fish line and at the same time effect lifelike movements.

This object of the improvement is accomplished by the construction illustrated in the accompanying drawings in which:

Fig. 1 is a side elevation of the bait complete;

Fig. 2 is a plan view of the top of the body;

Fig. 3 is a similar view of the bottom of the body, the hooks being omitted;

Fig. 4 is an end elevation of the body showing the head thereof; and

Fig. 5 is a similar view with the head in cross-section on the line 5—5 of Fig. 1.

Similar characters of reference indicate corresponding parts throughout the several views and referring now to the same:

1 is a bait body of conical form preferably made of wood or other material sufficiently buoyant as to support itself and appurtenances thereto at the surface of the water. 2 are cluster hooks attached to the bottom of the bait body by anchors 3 of any suitable character, and 4 is a screw-eye at the head of the bait body for the attachment of a fish line.

In each side of the body at the head end thereof is made a curved recess 5 so formed as to leave intact a ridge 6, the sides 7 of which converge downwardly and terminate near the bottom so that the upper face 8 presents a broad area while the opposite or bottom portion 9 is comparatively narrow, which bottom portion constitutes a throat. The recesses are undercut so that their innermost depths near the bottom of the body are in close proximity to each other and their rear walls 10 present extensive transverse areas.

The recesses 5 may be formed by the use of a rapidly rotating bit (not shown), the axial center 11 of which is positioned at right angles to the faces 7 of the ridge and also at right angles to the longitudinal center of the body. In this manner the head of the bait is formed so that its sides 7 are parallel to the longitudinal axis of the bait body and vertically convergent toward the bottom. The positioning of the bit may be varied to some extent which will of course effect corresponding variations in the relative positions of the recesses and still leave the head of the bait formed with the broad faced slanting ridge and the transverse curved faces 10 that partially underlie the ridge. By thus forming the head the extensive areas of the transverse faces and the slanting face of the ridge occasion considerable resistance as the body is drawn through the water and deflect the bait downwardly. The ridge having a broad face and downward slant encounters the water and directs the head of the body downwardly, and this tendency is augmented by the water which is divided by the ridge and encounters the transverse faces which also tend to direct the head downwardly and divert the bait alternately in opposite lateral directions so that the course of the body as it is drawn through the water is of a pronounced downward and wobbling tendency. When the tension of the fish line is slackened, the bait being buoyant rises to the surface of the water.

What I claim is:

1. An artificial bait comprising a buoyant hook-supporting body, the head of which has opposite undercut recesses in its sides, and a ridge intervening therebetween, the top face of the ridge extending recedingly from its front end and being comparatively broader than its lower end, the lateral faces of the ridge being flat and converging from the lateral sides of the top face to the bottom of the corresponding recesses, there being a narrow throat at the bottom of the